SIGNAL IDENTIFICATION AND ALIGNMENT SYSTEM

Filed July 8, 1957

INVENTORS
SOLOMON ZADOFF
WILLIAM ABOUREZK
BY
C. V. Craddock
ATTORNEY

INVENTORS
SOLOMON ZADOFF
WILLIAM ABOUREZK
BY
L. V. Craddock
ATTORNEY

United States Patent Office 3,008,125
Patented Nov. 7, 1961

3,008,125

SIGNAL IDENTIFICATION AND ALIGNMENT SYSTEM

Solomon Zadoff, Flushing, and William Abourezk, Huntington Station, N.Y., assignors to Sperry Rand Corporation, a corporation of Delaware Filed July 8, 1957, Ser. No. 670,852
7 Claims. (Cl. 340—170)

The present invention concerns communication systems utilizing phase coded pulsed carrier signals, and more specifically, relates to signal receiving means for use in such systems having the two-fold purpose of unambiguously identifying a desired one of said phase coded pulsed carrier signals and aligning a locally generated phase coded signal with said identified signal.

In copending U.S. patent application Serial No. 588,570, filed on May 31, 1956, in the names of Robert L. Frank and Solomon Zadoff, and assigned to the present assignee, there is described a phase coded hyperbolic navigation system utilizing phase coded pulsed carrier transmissions. Phase coding is defined therein as the introduction of discrete amounts of phase shift in the carrier of the pulsed signals, the phase shift being introduced during the time interval between the occurrence of individual pulses.

In copending U.S. patent application Serial No. 652,310, filed on April 11, 1957, also in the names of Robert L. Frank and Solomon Zadoff, one of the systemic advantages accruing to the use of particular phase coding sequences is exploited by the provision of receiving means for unambiguously distinguishing a predetermined one of a plurality of received phase coded signals.

In another patent application Serial No. 654,969, filed on April 24, 1957, in the name of Solomon Zadoff, there is disclosed means for phase synchronizing a locally generated phase coded signal with a transmitted phase coded signal certain of whose characteristics are known in advance.

A principal object of the present invention is to provide simplified receiver means for both distinguishing a predetermined one of a plurality of phase coded transmitted signals and aligning therewith a locally generated phase coded signal.

Another object of the present invention is to cross-correlate a locally generated phase coded signal with received phase coded signals so as to generate a control signal whose presence is indicative of at least a partial alignment of a locally generated signal with a predetermined one of said received phase coded signals.

An additional object of the present invention is to cross-correlate a locally generated phase coded signal with a received phase coded signal to produce a control signal for modifying the time of occurrence of the locally generated signal for aligning the locally generated signal with the received signal.

A further object of the present invention is to provide phase coded pulsed carrier signal detection apparatus wherein a received phase coded signal, definable by a predetermined matrix, is phase compared with a locally generated phase coded signal definable by a portion of the matrix of the received phase coded signal to produce an output signal indicative of phase alignment between the locally generated signal and the portion of the received phase coded signal corresponding thereto.

Yet another object is to provide means for distinguishing between two phase coded signals one of which is definable by a predetermined matrix, and the other of which is determined by only a portion of said predetermined matrix.

A further object is to provide signal detection means adapted to compare a received phase coded signal definable by a predetermined matrix with a locally generated phase coded signal definable by the same matrix, an initial comparison being made between the entire matrix of the received signal with a portion of the matrix of the locally generated signal to identify the received signal following which identification the entire matrix of the locally generated signal is compared with the received signal for purposes of phase aligning the two.

According to the present invention, these and other objects, as will appear upon a reading of the following specification, are achieved by the provision of phase detection apparatus adapted to receive phase coded signals and a locally generated phase coded signal which is definable by the same matrix uniquely describing a predetermined desired one of said received signals. For purposes of initially distinguishing the desired one of the received phase coded signals, only a portion of the locally generated signal, as described by a portion of said matrix, is applied to the phase detection apparatus. Upon the concurrence at the phase detection apparatus of the aforesaid portion of the locally generated signal with the corresponding portion of the received signal, a control signal is produced indicative of a preliminary degree of alignment between the entire matrices defining the locally generated and the received signals.

The control signal, when produced, causes the application of the entire locally generated signal, defined by the aforesaid matrix in its entirety, to the phase detection apparatus. In the event that the control signal is then no longer produced, the locally generated signal is shifted in time relative to the received signal until the control signal reappears. Upon the reappearance of the control signal, at a time when the entire locally generated signal, defined by the entire matrix thereof, is applied to the phase detection apparatus with the received signal, the time shifting of the locally generated signal is terminated and the alignment process is completed.

The other phase coded pulsed carrier transmissions to which the signal detection apparatus of the present invention is to be non-responsive, are each defined by matrices which do not include that portion of the locally generated signal matrix employed in the initial signal discriminating process.

For a more complete understanding of the invention, reference should be had to the following description and to the appended drawings of which:

Figure 1:
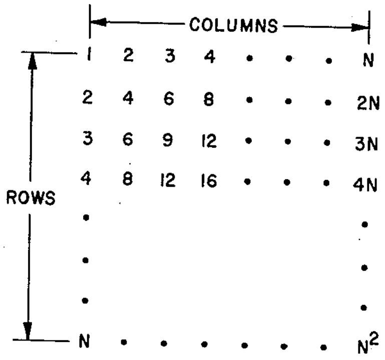
FIG. 1 shows, in matrix form, the generalized phase progression of successive phase coded signals which may be utilized by the present invention.

In copending U.S. patent application Serial No. 650,534, filed on April 3, 1957, in the name of Robert L. Frank, the generalized phase coding matrix of FIG. 1 is explained in detail. Briefly, the matrix comprises N rows and N columns of numerals, the numerals representing multiplying coefficients of a basic phase angle. The basic phase angle is defined as being equal to $$\frac{2\pi p}{N}$$

where $p$ and N are integers greater than zero and $p$ is relatively prime to N; that is, there are no integers $a$ and $b$ both of which are less than N such that $ap=bN$. For example, if $N=8$, then $$\frac{b}{a}=\frac{p}{8}$$

Accordingly, $p$ may have the values of 1 or 3 or 5 etc., any one of which values will satisfy the requirement of $p$ being relatively prime to N.

Assuming, for example, that a basic phase angle of 135° is employed, the successive pulses represented by the successive numerals of the first row of the matrix of FIG. 1 bear successive carrier phase angles of 135° (1×135°), 270° (2×135°), 405° (3×135°), and so on as measured relative to the phase of an arbitrary continuous wave signal. In other words, the phase progression of the successive pulses contained in the first row of the matrix of FIG. 1 will be in steps of one unit of basic phase angle. The phase progression of the successive pulses represented by the second row of numerals of the matrix will advance in steps of two units.

Figure 2:
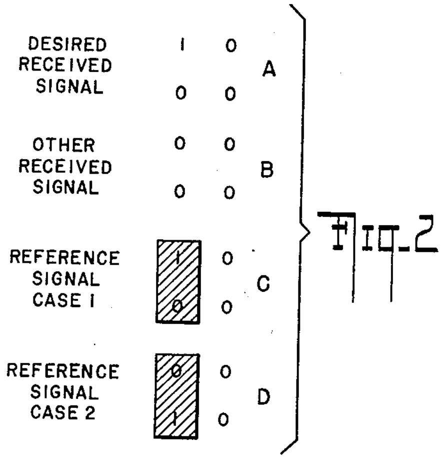
FIG. 2 shows, in matrix form, a simplified phase code utilized in the illustrative apparatus of the present invention.
Figure 3:
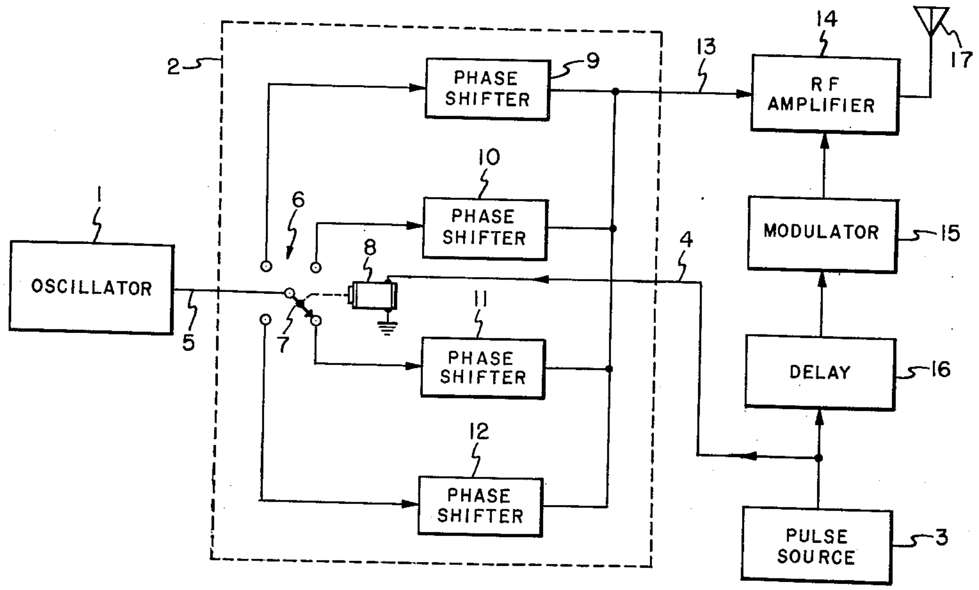
FIG. 3 is a simplified block diagram, partially schematic in form, of a suitable transmitter of phase coded signals utilized by the receiver of the present invention.

Suitable means for the generation and transmission of phase coded signals, as shown in the matrix of FIG. 1, is illustrated in FIG. 3. In FIG. 3, a source of continuous wave carrier signals is generally represented by oscillator 1. The output signal of oscillator 1 is applied by line 5 to the signal input of phase coder 2, the control input to which is derived from the output of pulse source 3 via line 4. Pulse source 3 represents generally a source of continuous pulses of fixed repetition rate. Phase coder 2 comprises, in the illustrative case of FIG. 2, a mechanical stepping switch 6 whose movable arm 7 advances one contact position in response to each pulse which is applied via line 4 to stepping relay 8. Phase shifters 9, 10, 11, and 12, each have an input connected to a respective contact of stepping switch 6; the outputs thereof are connected together and are applied via line 13 to the signal input of R-F amplifier 14.

For the sake of simplicity and clarity, a simplified phase code, wherein $N=2$, will be utilized in the following specification. Such a simplified phase code is shown in FIG. 2. The first row of the matrix of FIG. 2A represents two successive pulses whose phase, relative to an arbitrary continuous wave signal, is represented by numerals. Numeral 1 signifies that the phase of the pulse that it represents bears a 180° phase relationship with respect to said arbitrary signal while the second pulse, designated by the numeral 0, is in phase with said arbitrary signal. Similarly, the second row of the matrix of FIG. 2A represents two additional and successive signals, both of which are in phase with the arbitrary continuous wave signal. Thus, the matrix of FIG. 2A represents four successive pulses, the first of which is out of phase and the remaining three pulses of which are in phase with an arbitrary continuous wave reference signal. It is assumed that after emission of the fourth pulse, designated by 0, the matrix will be repeated, i.e., the next following pulse will be out of phase with the arbitrary reference signal.

In conformance with the choice of a simplified phase code of two rows and two columns, phase coder 2 of FIG. 1 is shown as containing four phase shifters, one of which interposes 180° phase shift at the frequency of oscillator 1, and the other of which phase shifters interposes a 0° or 360° (or multiples thereof) phase shift.

Returning to FIG. 3, it will be seen that the signal appearing on line 13 is of the same frequency as the signal input on line 5, but will bear a phase relationship with respect thereto as determined by the particular phase shift with which movable arm 7 of stepping switch 6 is momentarily in contact. As previously mentioned, phase shifters 9, 10, 11, and 12 are adjusted to produce predetermined amounts of phase shift so that the phase of the successive output signals on line 13, as measured relative to the input signal on line 5, may be represented by the matrix of FIG. 2A.

The phase coded signal output of phase coder 2 is applied via line 13 to the signal input of R-F amplifier 14. R-F amplifier 14 is adapted to amplitude modulate the phase coded carrier signals applied thereto in response to modulating pulses as derived from modulator 15. Modulator 15, in turn, is triggered by pulses derived from pulse source 3 via pulse delay device 16. Pulse delay 16 produces a time differential between the operation of phase coder 2 and the operation of R-F amplifier 14 to provide for the diminution of transients produced by the operation of phase coder 2 before the phase coded pulsed carrier signals are passed by amplifier 14 for radiation by antenna 17.

Figure 4:
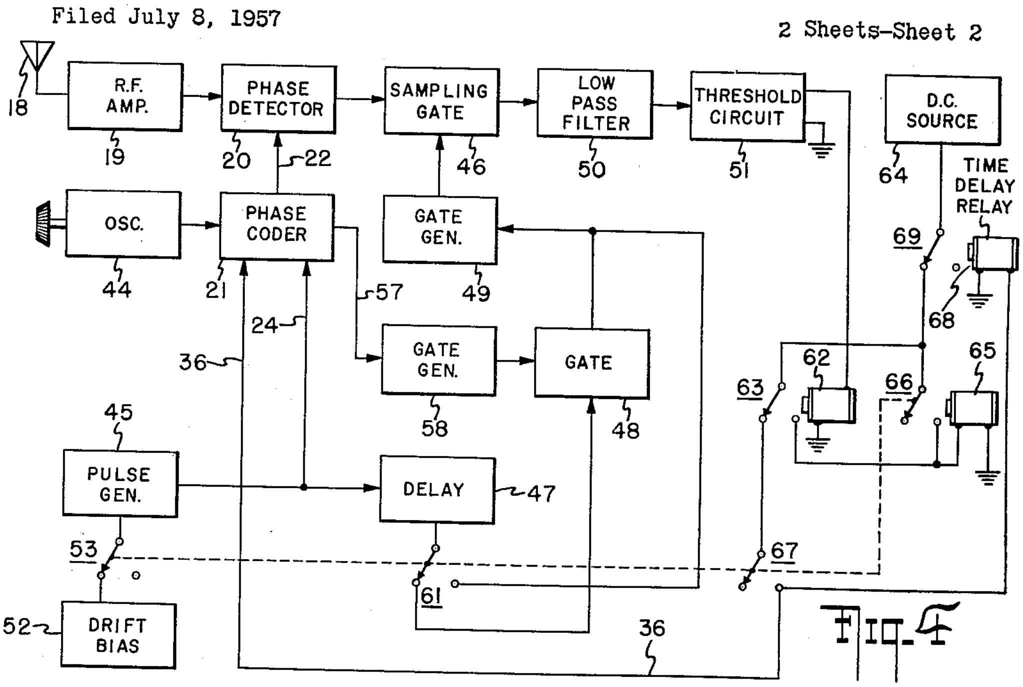
FIG. 4 is a block diagram, partially schematic in form, of a representative receiver embodying the phase coded signal discriminating and aligning apparatus of the present invention.

The phase coded signal discriminating and aligning apparatus of the present invention is embodied in the receiver structure of FIG. 4. In FIG. 4, the phase coded pulsed carrier signals, as may be transmitted by the structure of FIG. 3, are received by antenna 18 and amplified by R-F amplifier 19. The output of R-F amplifier 19 is applied to a first input of phase detector 20, a reference signal input to which is derived from phase coder 21 via line 22. Phase coder 21 may be of a form similar to that of phase coder 2 of FIG. 3 so as to produce phase coded signals defined by the same matrix as the matrix describing the phase coded signals produced at output line 13 of phase coder 2.

Phase coder 21 structurally differs from phase coder 2 of FIG. 3 only with respect to its actuating mechanism. As previously discussed, movable arm 7 of phase coder 2 advances one contact position in response to individual gating pulses applied via line 4 to stepping relay 8. For purposes of the present invention, as will be more fully explained hereinafter, the actuating mechanism of phase coder 21 is adapted not only to advance its movable arm one contact position in response to each applied unitary advance pulse, but also to abruptly advance the movable arm by a predetermined plurality of contact positions, corresponding to the number of pulses comprising a complete row in the matrix of the phase coded signal, in response to a multiple advance control signal.

Figure 5:
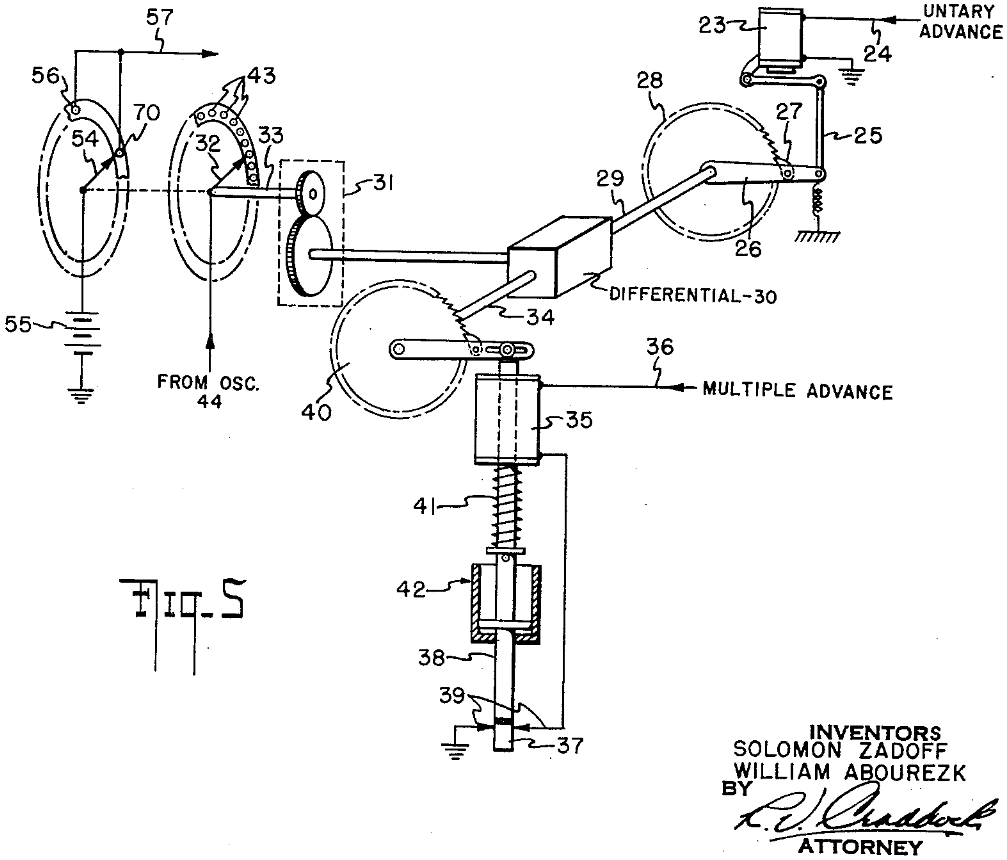
FIG. 5 is a schematic diagram of a representative stepping switch drive mechanism for use in the phase coder of FIG. 4.

There is shown in FIG. 5 an illustrative simplified embodiment of the actuating mechanism of phase coder 21. Stepping relay 23 is adapted to receive energizing pulses as applied via line 24 and is operative in response thereto by means of linkage 25, operating arm 26, and pawl 27 to rotate ratchet 28 through an angle occupied by one peripheral tooth. The angular motion of ratchet 28 is coupled via shaft 29 and differential 30 to gearing 31 which, in turn, advances movable arm 32 one contact position in response to each pulse applied via line 24. Gearing 31 is arranged to cause shaft 33 to rotate in equal angular amounts with shaft 29 in the absence of any displacement of shaft 34, which is the second input to mechanical differential 30. Thus, the actuating mechanism so far described will operate in precisely the same fashion (in the absence of displacement of shaft 34) as does stepping switch 6 of FIG. 3.

The additional solenoid and ratchet arrangement of FIG. 5 is adapted to produce an abrupt displacement of movable arm 32 over a predetermined number of contact positions in response to actuation of solenoid 35 by means of a direct current applied via line 36. In response to said direct current, solenoid 35 is energized via a continuous conductive path to ground including strip 37 affixed to shaft 38, which conductively connects contacts 39. Upon the energization of solenoid 35, shaft 38 is abruptly displaced opening contacts 39 and rotating ratchet 40 through an angle occupied by a predetermined plurality of circumferential teeth. Spring 41 returns shaft 38 to its lower position against the resistance of dash pot 42 which introduces a small fixed time delay between successive cycles of operation of solenoid 35 in the continued presence of the D.C. control current on line 36. The rotation of ratchet 40 is imparted via shaft 34, differential 30, gearing 31, and shaft 33 to movable arm 32. Movable arm 32 corresponds to movable arm 7 of stepping switch 6 of FIG. 3. It is assumed that each of the contacts 43 are connected to respective phase shifters as is the case with stepping switch 6 of FIG. 3. Although a large number of contacts 43 are suggested in the drawing, it is to be understood that only four are required in the generation of the illustrative four-step code of FIG. 2A.

The carrier signal input of phase coder 21 of FIG. 4 is obtained from variable frequency oscillator 44 whose frequency is adjustable to be substantially that of oscillator 1 of FIG. 3. The unitary advance input of phase coder 21 is derived from the output of pulse generator 45 which nominally operates at the same repetition rate as pulse source 3 of FIG. 3. The output of phase detector 20 is applied to the signal input of sampling gate 46 which is rendered conductive by the pulses produced by generator 45 and applied via delay 47, contacts 61, gate 48 (when conducting), and gate generator 49 to the control input of sampling gate 46.

As already mentioned, the phase coded signals transmitted by the apparatus of FIG. 3 are in the form of pulses. Assuming that the received signals and the reference signal inputs of phase detector 20 are in time alignment, the output signal therefrom is also in the form of pulses. The purpose of delay 47 is to activate sampling gate 46 at a time slightly delayed relative to the switching of the phase coder to provide for diminution of transients produced thereby prior to the time the pulse envelopes produced at the output of phase detector 20 are sampled by gate 46. The output of sampling gate 46 is applied via low pass filter 50 and conventional threshold circuit 51 to the control coil of relay 62.

It is shown in copending U.S. patent application Serial No. 650,534 that there is produced at the output of phase detector 20 a signal having a D.C. component in the sole event that the entire matrices defining the received signal and reference signal inputs thereto are in precise row and column alignment. By way of collateral proof, it is also shown therein that for any degree of column misalignment, irrespective of row alignment, no D.C. component is produced. The utility of the D.C. signal component that is produced only in the event of complete time alignment, i.e., precise row and column alignment, between the matrices defining the phase coded signal inputs to phase detector 20 may be demonstrated as follows. In certain types of communication systems for example, in hyperbolic navigation systems such as loran, it is desirable to achieve phase coherence between a remotely situated secondary timing standard and a predetermined one of a plurality of highly precise primary timing standards. In the case of a loran system, for example, the predetermined primary and the remotely situated secondary timing standards may be, respectively, a master transmitter carrier oscillator (such as oscillator 1 of FIG. 3) and a receiver local oscillator (such as oscillator 44 of FIG. 4).

The phase coding of the signals contemplated by the present invention may be considered to be a medium for the discriminatory reception by the receiver of FIG. 4 of information respecting the phase of the carrier signal generated by oscillator 1 of FIG. 3. The received carrier phase information is employed in achieving phase coherence between oscillator 44 of FIG. 4 and oscillator 1 of FIG. 3. The presence of a D.C. signal component at the output of detector 20 of FIG. 4 signifies the attainment of coherence between the received phase coded signal and the reference phase coded signal applied thereto. This, in turn, indicates that phase coherence has been established between oscillator 44 of FIG. 4 and oscillator 1 of FIG. 3.

It will be recognized that the signals produced at the output of phase coder 21 generally will not be in initial alignment with the received signals at the signal input of phase detector 20. Means are therefore provided for varying the time of occurrence of the output signals of phase coder 21 in order to search in the dimension of time for the received signals. The aforementioned means include a source of drift bias 52 which is applied via contacts 53, when closed, to pulse generator 45, to vary the repetition rate at which it is operating in a conventional manner.

In accordance with the present invention, a plurality of signals are received, the desired one of said plurality being definable by a matrix such as shown in FIG. 2A. The other of said received signals, emanating from respective transmitters (not shown), may or may not be phase coded but if phase coded, such other signals are definable by matrices omitting at least one of the columns of the matrix defining the desired signal. Thus, the matrix of FIG. 2A may represent the desired received signal and the matrix of FIG. 2B may represent one of the other of the received phase coded signals. For the sake of simplicity, the matrix of FIG. 2B represents an uncoded received signal all of whose columns correspond to the second (i.e., uncoded) column of the matrix of FIG. 2A.

In the signal identification mode of operation of the present invention, the receiver of FIG. 4 is rendered operative only during the time that the signals represented by the unique matrix of the desired signal column, not shared by the other recevied signals, is being generated in phase coder 21. Accordingly, means are provided to activate sampling gate 46 of FIG. 4 only during the time that the uniquely phase coded signals are applied via line 22 to phase detector 20. Said means include a second movable arm 54 which is connected to shaft 33 of the actuating mechanism of FIG. 5. Arm 54 is energized as by means of source 55 so that when arm 54 passes predetermined positions, successively closing contacts 56 and 70, a voltage is impressed on line 57, energizing gate generator 58 of FIG. 4. Movable arms 54 and 32 of FIG. 5 are so mutually positioned that when arm 32 contacts those phase shifters which produce the unique matrix column (such as column 1 of FIG. 2A), a voltage is produced on line 57.

Returning to FIG. 4, gate generator 58 may be of the form of a conventional one-shot multivibrator which produces an output rectangular waveform whose leading edge is concurrent with an applied input pulse and whose trailing edge occurs a predetermined time thereafter. Generator 58 produces an output rectangular pulse having a time duration less than the time separation between successive row pulses defined by the matrix of FIG. 2A.

The output pulse of generator 58 renders gate 48 conductive so as to pass selected ones of the output pulses of generator 45 as delayed by delay 47. The selected output pulse from gate 48 is applied to gate generator 49 whose output, in turn, renders sampling gate 46 conductive so as to sample the leading edges of those output pulses of phase detector 20 corresponding to the unique column of the matrix of FIG. 2A.

Assuming, for example, that the matrix defining the reference signal output of phase coder 21 is in precise time alignment with the matrix defining the desired phase coded signal at the output of R-F amplifier 19, a pulsed signal containing a D.C. component is produced at the output of phase detector 20. Such an alignment between the reference and received signals may be seen by reference to FIGS. 2A and 2C.

The D.C. component, produced at the output of sampling gate 46, is passed by low pass filter 50 and threshold circuit 51 and then applied to the control coil of relay 62. Threshold circuit 51 is arranged to pass the desired D.C. signal component at the output of low pass filter 50 and to remain non-responsive to lower amplitude spurious noise components.

Upon the energization of relay 62, its associated contacts 63 (shown in the deactivated position) connect D.C. source 64 to the coil of relay 65 via deactivated contact 69 of relay 68. Upon the energization of relay 65, its holding contact 66 (shown in the deactivated position) provides a parallel path to continue the operation of relay 65 in the event that relay 62 should become de-energized. Contacts 53, 61, and 67 are additional contacts of relay 65 and are simultaneously moved to their activated position (opposite to that shown) with the activation of contacts 66.

Upon the activation of contacts 53, drift bias source 52 is disconnected from pulse generator 45, terminating the signal searching mode of operation. Upon the activation of contacts 61, the output pulses from delay 47 are shunted around gate 48 so that all of said output pulses activate gate generator 49 rather than only those which correspond to the pulses comprising the unique column of the desired signal matrix.

In the previously assumed case of FIG. 2C, wherein the reference and received signals are in precise column and row alignment at the inputs of phase detector 20, the operation of sampling gate 26 over the entire matrix does not change the amplitude of the output D.C. component that is produced at the output of filter 50 when gate 46 is operated only when the pulses of the unique column (shown shaded) of FIG. 2C occur. However, the maintenance of the D.C. signal at the output of filter 50, upon the utilization of the entire reference signal matrix, is indicative of complete column and row alignment between the received signal and reference signal matrices at the inputs of phase detector 20.

Assuming that half the reference signal matrix is in column alignment with the desired signal matrix, but in row misalignment with respect thereto, as shown in FIG. 2D, a D.C. component again will be produced at the output of phase detector 20. Said D.C. component energizes relay 65, as previously described, whose activated contacts 53 and 61 respectively terminate the search mode of operation and cause the application of the entire reference matrix to phase detector 20.

In the assumed case of column alignment but row misalignment of FIG. 2D, the D.C. signal generated by use of half the reference matrix will disappear when the entire matrix is utilized. For the simplified matrix of FIG. 2A, such an event is self-evident, i.e., when the corresponding pulses of the received signal and reference signal matrices are of the same phase, a positive D.C. signal will be produced at the output of phase detector 20 whereas when the corresponding pulses of the respective matrices are out of phase, a negative D.C. signal will be produced. Thus, of the four successive pulse combinations of received signal matrix 2A and reference signal matrix 2D, two plus and two minus signal outputs are produced which cancel each other in low pass filter 50. A more rigorous treatment of the phenomenon of D.C. signal elimination in the case of column alignment but row misalignment between two generalized signal matrices as shown in FIG. 1, is given in copending U.S. patent application Ser. No. 650,534.

Upon the disruption of the D.C. signal at the output of threshold circuit 51, following the application of the complete matrix, relay 62 becomes de-energized causing contacts 63 to reassume their initial deactivated position as shown in FIG. 4.

It will be remembered that relay 65 continues to be energized via activated holding contacts 66 despite the interruption of energization of relay 62. Upon the concurrence of the de-energization of relay 62 and the operation of relay 65, D.C. source 64 is applied to line 36 via deactivated contacts 63 and activated contacts 67, in turn energizing the multiple advance input 36 of FIG. 5 and the control coil of time delay relay 68 of FIG. 4. Time delay relay 68 is adjusted to respond after a time at least equal to that required by the successive actuation of relay 35 of FIG. 5 to advance movable arm 32 in abrupt increments of one row at a time throughout all the rows of the matrix of FIG. 2A. When the matrix of FIG. 2D is brought into row alignment with the matrix of FIG. 2A as a result of the operation of relay 35 of FIG. 5, a D.C. signal will appear at the output of threshold circuit 51, re-energizing relay 62. At such time the original reference matrix of FIG. 2D will be time-shifted into the form of the matrix of FIG. 2C and the alignment of the matrix of the reference signal input of phase detector 20 with respect to the received signal matrix will be completed.

Time delay relay 68 is provided to take into account the possibility that relay 62 may be initially energized not by the condition of column alignment between the reference and signal inputs to phase detector 20, but rather by the appearance of spurious noise signals of amplitude sufficient to pass threshold circuit 51. In such a case, the aforementioned cycle of operation will be repeated with the reference matrix being advanced in time in increments of matrix rows until all the matrix row possibilities have been successively applied to phase detector 20, whereupon no D.C. signal will reappear at the output of threshold circuit 51. In such event, relay 68 will be caused to operate moving its associated contacts 69 to a position opposite that shown, interrupting the application of the output potential of D.C. source 64 and restoring the entire receiving system of FIG. 4 to the signal searching mode of operation.

During the signal searching mode of operation, there is, of course, the possibility that the phase coded reference signal will be brought into alignment with some received signal other than the desired signal. Assuming that the reference signal matrix, either as shown in FIGS. 2C or 2D, is time-shifted into alignment with the received signal represented by the matrix of FIG. 2B, no D.C. signal will be produced at the output of phase detector 20.

As was previously mentioned, and as shown in detail in copending U.S. patent application Serial No. 650,534, no D.C. component is produced at the output of the phase detector where there is any degree of column misalignment, irrespective of row misalignment, between the received signal and reference signal inputs to the phase detector. It can be seen by a comparison of FIGS. 2A and 2B that the matrix of FIG. 2B omits the unique first column of the desired signal matrix of FIG. 2A. Thus, as said unique column, in the search mode of operation, is brought into alignment with either of the columns of the signal of FIG. 2B (both columns thereof being the same in this illustrative case only), the effect is the same as though the reference signal matrix were being phase compared with the desired signal matrix and the reference and desired signal matrices were time-shifted so as to produce column misalignment; namely, no D.C. output will be produced from the phase detector.

In the case of the simplified phase codes of FIG. 2, the aforementioned effect may be demonstrated as follows. For example, if the unique column of the matrices of either FIG. 2C or 2D is brought into alignment with either column of the matrix of FIG. 2B, two successive output pulses of opposite polarity will be produced at the output of phase detector 20, hence at the output of sampling gate 46, and will cancel each other in low pass filter 50. As previously stated and as well known in the phase detector art, signals of opposite polarity are produced at the output of a phase detector in the event that the two signals being cross-correlated therein are successively in phase and out of phase with respect to each other.

In this way, the employment of the unique column of the reference signal contained in the desired signal matrix during the signal searching mode of operation effectively discriminates against signals having matrices omitting said unique column. It is only in the event that the employed column of the reference signal matrix is brought into alignment with the unique column of the desired signal matrix that a D.C. signal is produced at the output of phase detector 20.

As is also recognized in the phase detector art, no D.C. output is produced when the two signals applied thereto are in phase quadrature. In terms of the present invention, this phenomenon would preclude any response to the desired signal if said signal and the reference signal arbitarily were in time coincidence but phase quadrature at their respective inputs to phase detector 20. The absence of phase detector output in this relatively rare case may be circumvented by the provision of a second receiving channel including a second phase detector whose phase coded reference signal is placed in phase quadrature with the reference signal of phase detector 20. When the received signal is applied to both said second detector and detector 20 and the outputs therefrom are vectorally combined, the combined output will not be sensitive to any arbitrary phase angle between the received signal and reference signal but will be sensitive only to the column and row alignment of the matrices defining the signals. A detector utilizing suitable vectorial combining means is shown in U.S. Patent 2,397,961, issued to H. Harris, Jr., on April 9, 1946, and assigned to the present assignee.

In operation, the present invention provides for the identification of a desired one of a plurality of phase coded signals by phase comparing a predetermined portion of a reference signal matrix with the received signals. The reference signal is time shifted, relative to the received signals, until a D.C. potential is produced at the output of threshold circuit 51. The appearance of such a D.C. potential is normally indicative at least of column alignment between the entire reference and desired signal matrices. The aforesaid predetermined portion of the reference matrix comprises at least one column thereof which is uniquely shared by the desired signal matrix. That is, the phase coded signals other than the desired signal omit in their respective matrices that unique portion of the reference signal matrix which is utilized for signal identification purposes.

Upon the appearance of a D.C. signal at the output of threshold circuit 51, the entire reference matrix is compared with the desired received signal matrix. In the event that the D.C. signal should then disappear after the application of the entire reference signal matrix, provision is made for abruptly time shifting the reference signal matrix in increments of matrix rows. Upon the reappearance of a D.C. signal at the output of threshold circuit 51, the time shifting of the matrix rows of the reference signal is terminated, thus completing the signal aligning mode of operation of the present invention.

It can be seen from the foregoing specification that the objects of the present invention have been achieved by the provision of apparatus adapted to receive a plurality of phase coded signals and operative to distinguish a desired one of said plurality of signals and to completely align a locally generated phase coded signal with the identified desired received signal.

The present invention operates to achieve such identification and alignment through the expedient of selective phase comparison of a locally generated signal with the desired received signal. In the preferred embodiment of the invention shown in FIG. 4, selective phase comparison is achieved by the use of a phase detector and an output sampling gate, the sampling gate being selectively energized first for a portion of the reference signal (for identification purposes) and then for the entire reference signal (for alignment purposes). Alternative selective phase comparison schemes will occur to those skilled in the art. For example, the selective phase comparison may be accomplished by selectively gating the receiver input to the phase detector or by selectively gating the reference signal input to the phase detector, in which case a sampling gate, such as sampling gate 46, would not be additionally required at the output of phase detector 20.

While a single column unique to the desired signal has been employed in the illustrative embodiment of the present invention, as shown in FIG. 4, it will be understood that should extended codes be utlized, i.e., codes wherein N is greater than 2, more than one such unique column may be employed during the signal identification mode of operation. The only requirement is that column or columns so utilized be unique to the desired signal and not contained in the matrices defining the other of the received signals.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In apparatus adapted to receive a plurality of phase coded signals, a desired one of which is definable by a matrix of N rows and N columns, wherein at least one of the columns is unique to said desired signal and not contained in the respective matrices defining the other of the received signals, means for identifying said desired signal and for partially aligning therewith a locally generated signal, said means comprising a local source for producing a reference signal defined by the same matrix as said desired signal, said local source including means for time drifting the entire matrix of said reference signal relative to said received signals, means adapted to receive said received signals and said locally generated signal for phase comparing with the matrices defining the received signals a portion of the reference signal matrix, said portion comprising said unique columns of said reference matrix, said phase comparing means being operative to cross-correlate said reference signal and said received signals to produce an output signal related to the relative phase therebetween, means adapted to receive the output of said phase comparing means for producing a control signal related to the D.C. component thereof, said control signal indicating alignment between all the columns of the matrices defining, respectively, the desired received signal and said reference signal, and means for applying said control signal to said means for time drifting, whereby said means for drifting is deactivated.

2. In apparatus adapted to receive a plurality of phase coded signals, a desired one of which is definable by a matrix of N rows and N columns, wherein at least one of the columns is unique to said desired signal and not contained in the respective matrices defining the other of the received signals, means for identifying said desired signal and for completely aligning therewith a locally generated signal, said means comprising a local source for producing a reference signal defined by the same matrix as said desired signal; said local source including means for time drifting the entire matrix of said reference signal relative to said received signals, and means for abruptly shifting said matrix of the reference signal in time relative to said received signals in increments of matrix rows in response to a second control signal; means adapted to receive said received signals and said locally generated signal for selectively phase comparing with the matrix defining the received signals first and second portions of the reference signal matrix, said first portion comprising said unique columns of said reference matrix and said second portion comprising all the columns of said reference matrix, said selective phase comparing means being operative to cross-correlate said reference signal and said received signals to produce an output signal related to the relative phase therebetween, means adapted to receive the output of said selective phase comparing means for producing a first control signal related to the D.C. component thereof, means for applying said first control signal to said means for time drifting, whereby said means for drifting is deactivated, means for applying said first control signal to said selective phase comparing means, whereby said second portion of said reference signal matrix is phase compared with the received signal matrix, first means responsive to the successive appearance and loss of said first control signal for generating said second control signal, means for applying said second control signal to said means for abruptly shifting, and second means responsive to the successive appearance, loss, and reappearance of said first control signal for deactivating said first means.

3. In apparatus adapted to receive a plurality of phase coded signals, a desired one of which is definable by a matrix of N rows and N columns, wherein at least one of the columns is unique to said desired signal and not contained in the respective matrices defining the other of the received signals, means for identifying said desired signal and for partially aligning therewith a locally generated signal, said means comprising a signal detector having two inputs and an output and adapted to receive at one of said inputs the received signals, a local source coupled to the other of said detector inputs for producing a reference signal defined by the same matrix as said desired signal, said local source including means for time drifting the entire matrix of said reference signal relative to said received signals, said detector being operative to cross-correlate said reference signal and said received signals to produce an output signal related to the relative phase therebetween, means for sampling the output signal of said detector in response to applied triggers, said local source including a source of said triggers, means for applying those trigger pulses occurring in time with the unique columns of said reference matrix to said sampling means, means adapted to receive the output of said sampling means for producing a control signal related to the D.C. component thereof, said control signal indicating alignment between all the columns of the matrices defining, respectively, the desired one of said received signals and said reference signal, and means for applying said control signal to said means for time drifting whereby said means for drifting is deactivated.

4. In apparatus adapted to receive a plurality of phase coded signals, a desired one of which is definable by a matrix of N rows and N columns wherein at least one of the columns is unique to said desired signal and not contained in the respective matrices defining the other of the received signals, means for identifying said desired signal and for completely aligning therewith a locally generated signal defined by the same matrix as said desired signal, said means comprising a signal detector adapted to receive the received signals and said reference signal, a local source for producing said reference signal, said local source including means for time-drifting the entire matrix of said reference signal, and means for abruptly shifting said matrix of the reference signal in time relative to said received signals in increments of matrix rows in response to a second control signal; said detector being operative to cross-correlate said reference signal and said received signals to produce an output signal related to the relative phase therebetween, means for sampling the output signal of said detector in response to applied triggers, said local source including a source of said triggers, means for selectively applying first and second portions of said triggers to said sampling means, said first portion comprising those trigger pulses occurring in time with the unique columns of said reference matrix, and said second portion comprising those trigger pulses occurring in time with all the columns of the reference signal matrix, means adapted to receive the output of said sampling means for producing a first control signal related to the D.C. component thereof, means for applying said first control signal to said means for drifting whereby said means for drifting is deactivated, means for applying said first control signal to said means for selectively applying whereby said second portion of said trigger pulses are applied to said sampling means, first means responsive to the successive appearance and loss of said first control signal for generating said second control signal means for applying said second control signal to said means for abruptly shifting, and second means responsive to the successive appearance, loss, and reappearance of said first control signal for deactivating said first means.

5. In combination with the apparatus of claim 4, means for monitoring the duration of said second control signal and for deactivating said first means when said duration equals a predetermined amount.

6. Apparatus as defined in claim 4 wherein said signal detector is a phase detector.

7. Apparatus as defined in claim 4 wherein said means adapted to receive the output of said sampling means comprises a low pass filter.

No references cited.